(12) United States Patent
Govorkov et al.

(10) Patent No.: US 6,987,790 B2
(45) Date of Patent: Jan. 17, 2006

(54) EXCIMER OR MOLECULAR FLUORINE LASER WITH SEVERAL DISCHARGE CHAMBERS

(75) Inventors: Sergei V. Govorkov, Boca Raton, FL (US); Rainer Paetzel, Dransfeld (DE); Igor Bragin, Goettingen (DE); Rainer Desor, Bovenden (DE); Andreas Targsdorf, Friedland (DE); Andriy Knysh, Boca Raton, FL (US)

(73) Assignee: Lambda Physik AG, Goettingen (DE)

( * ) Notice: Subject to any disclaimer, the term of this patent is extended or adjusted under 35 U.S.C. 154(b) by 1 day.

(21) Appl. No.: 10/776,137

(22) Filed: Feb. 11, 2004

(65) Prior Publication Data

US 2004/0202219 A1 Oct. 14, 2004

Related U.S. Application Data

(60) Provisional application No. 60/463,790, filed on Apr. 18, 2003, provisional application No. 60/452,719, filed on Mar. 6, 2003, provisional application No. 60/447,420, filed on Feb. 14, 2003.

(51) Int. Cl.
*H01S 3/22* (2006.01)
*H01S 3/223* (2006.01)
*H01S 3/097* (2006.01)

(52) U.S. Cl. ............................ 372/86; 372/55; 372/56; 372/57; 372/81

(58) Field of Classification Search ............ 372/55–57, 372/69, 81, 82, 86, 87
See application file for complete search history.

(56) References Cited

U.S. PATENT DOCUMENTS

| | | | | |
|---|---|---|---|---|
| 4,837,773 A | * | 6/1989 | Wakata et al. ............... | 372/86 |
| 5,313,487 A | * | 5/1994 | Fujikawa et al. ............ | 372/86 |
| 5,754,579 A | * | 5/1998 | Mizoguchi et al. .......... | 372/58 |
| 6,370,174 B1 | | 4/2002 | Onkels et al. ........... | 372/38.04 |
| 6,381,257 B1 | | 4/2002 | Ershov et al. ............... | 372/57 |
| 6,456,643 B1 | * | 9/2002 | Osmanow et al. ........... | 372/86 |
| 6,549,551 B2 | * | 4/2003 | Ness et al. .............. | 372/38.07 |
| 6,556,600 B2 | | 4/2003 | Sandstrom et al. .......... | 372/25 |
| 6,618,421 B2 | | 9/2003 | Das et al. ..................... | 372/55 |
| 6,625,191 B2 | | 9/2003 | Knowles et al. ............. | 372/55 |
| 6,690,704 B2 | | 2/2004 | Fallon et al. ................ | 372/58 |
| 6,721,344 B2 | | 4/2004 | Nakao et al. ................. | 372/55 |

(Continued)

*Primary Examiner*—Wilson Lee
*Assistant Examiner*—Leith A. Al-Nazer
(74) *Attorney, Agent, or Firm*—Stallman & Pollock LLP

(57) ABSTRACT

Precise timing control can be obtained for a gas discharge laser, such as an excimer or molecular fluorine laser, using a timed trigger ionization. Instead of using a standard approach to control the timing of the emission or amplification of an optical pulse using the discharge of the main electrodes, the timing of which can only be controlled to within about 10 ns, a trigger ionization pulse applied subsequent to the charging of the main electrodes can be used to control the timing of the discharge, thereby decreasing the timing variations to about 1 ns. Since ionization of the laser gas can consume relatively small amounts of energy, such a circuit can be based on a fast, high-voltage, solid state switch that is virtually free of jitter. Trigger ionization also can be used to synchronize the timing of dual chambers in a MOPA configuration. In one such approach, ionization trigger can include at least a portion of the optical pulse from the oscillator in a MOPA configuration.

14 Claims, 12 Drawing Sheets

U.S. PATENT DOCUMENTS

| | | |
|---|---|---|
| 6,741,627 B2 | 5/2004 | Kitatochi et al. .............. 372/57 |
| 6,754,247 B2 * | 6/2004 | Kakizaki et al. .............. 372/57 |
| 6,771,685 B1 * | 8/2004 | Yabu et al. ................... 372/87 |
| 2002/0012376 A1 * | 1/2002 | Das et al. ..................... 372/58 |
| 2002/0085606 A1 | 7/2002 | Ness et al. .................... 372/55 |
| 2003/0099269 A1 | 5/2003 | Ershov et al. ................ 372/55 |
| 2004/0047386 A1 | 3/2004 | Das et al. ..................... 372/55 |
| 2004/0057489 A1 | 3/2004 | Fallon et al. ................. 372/57 |

* cited by examiner

EXCIMER OR MOLECULAR FLUORINE LASER WITH SEVERAL DISCHARGE CHAMBERS

CLAIM OF PRIORITY

This application claims priority to U.S. Provisional Patent Application No. 60/447,420, entitled "EXCIMER OR MOLECULAR FLUORINE LASER WITH SEVERAL DISCHARGE CHAMBERS," to Sergei V. Govorkov, filed Feb. 14, 2003; U.S. Provisional Patent Application No. 60/463,790, entitled "EXCIMER OR MOLECULAR FLUORINE LASER WITH SEVERAL DISCHARGE CHAMBERS," to Sergei V. Govorkov et al., filed Apr. 18, 2003; as well as U.S. Provisional Patent Application No. 60/452,719, entitled "EXCIMER OR MOLECULAR FLUORINE LASER SYSTEM WITH PRECISION TIMING," filed Mar. 6, 2003, which are hereby incorporated herein by reference.

TECHNICAL FIELD OF THE INVENTION

The present invention relates to timing and synchronization in high power excimer or molecular fluorine lasers, such as are useful for applications in microlithography and semiconductor processing.

BACKGROUND

Semiconductor manufacturers are currently using deep ultraviolet (DUV) lithography tools based on KrF-excimer laser systems, operating at wavelengths around 248 nm, as well as ArF-excimer laser systems, which operate at around 193 nm. Vacuum UV (VUV) tools are based on $F_2$-laser systems operating at around 157 nm. These relatively short wavelengths are advantageous for photolithography applications because the critical dimension, which represents the smallest resolvable feature size that can be produced photolithographically, is proportional to the wavelength used to produce that feature. The use of smaller wavelengths can provide for the manufacture of smaller and faster microprocessors, as well as larger capacity DRAMs, in a smaller package. In addition to having smaller wavelengths, such lasers have a relatively high photon energy (i.e., 7.9 eV) which is readily absorbed by high band gap materials such as quartz, synthetic quartz ($SiO_2$), Teflon (PTFE), and silicone, among others. This absorption leads to excimer and molecular fluorine lasers having even greater potential in a wide variety of materials processing applications. Excimer and molecular fluorine lasers having higher energy, stability, and efficiency are being developed as lithographic exposure tools for producing very small structures as chip manufacturing proceeds into the 0.18 micron regime and beyond. The desire for such submicron features comes with a price, however, as there is a need for improved processing equipment capable of consistently and reliably generating such features. Further, as excimer laser systems are the next generation to be used for micro-lithography applications, the demand of semiconductor manufacturers for powers of 40 W or more to support throughput requirements leads to further complexity and expense.

DETAILED DESCRIPTION

Figure 1:
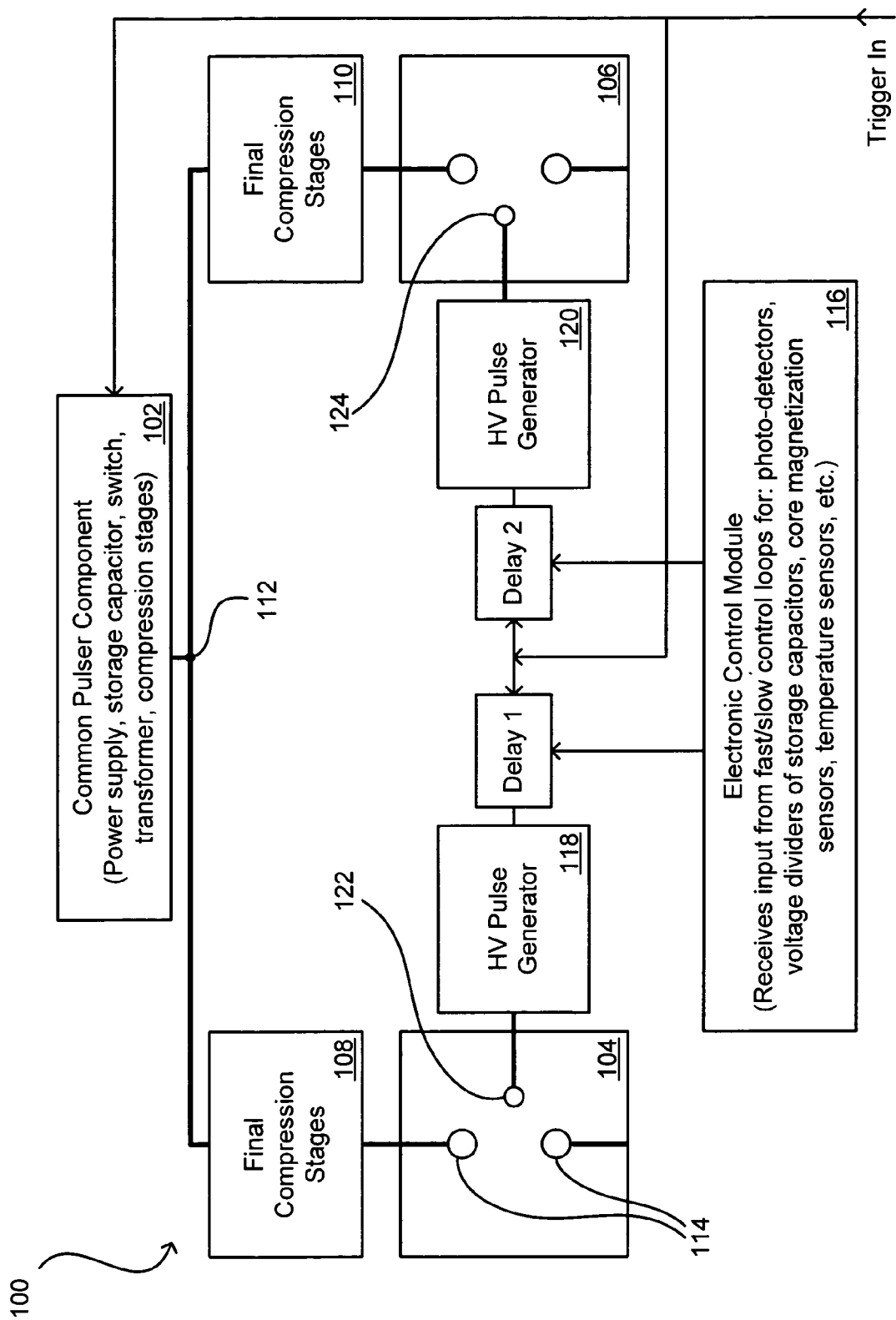
FIG. 1 is a diagram of a multi-chamber laser system in accordance with a first embodiment of the present invention.

As semiconductor manufacturers move toward the production of chips with smaller sizes, the requirements on the processing and manufacturing equipment, including the laser light sources, are ever increasing. In laser systems used for photolithography applications, for example, it would be desirable to move toward higher repetition rates, increased energy stability and dose control, increased system uptime, narrower output emission bandwidths, improved wavelength and bandwidth accuracy, and improved compatibility with stepper/scanner imaging systems. It also would be desirable to provide lithography light sources that deliver high spectral purity and extreme power, but that also deliver a low cost chip production. Requirements of semiconductor manufacturers for higher power and tighter bandwidth can place excessive and often competing demands on current single-chamber-based light sources. Many of these obstacles can be overcome by taking advantage of a dual-gas-discharge-chamber technology, referred to herein as MOPA (Master Oscillator—Power Amplifier) technology. MOPA technology is discussed further in U.S. patent application Ser. No. 10/696,979, entitled "MASTER OSCILLATOR—POWER AMPLIFIER EXCIMER LASER SYSTEM," filed Oct. 30, 2003, which is incorporated herein by reference. MOPA technology can be used to separate the bandwidth and power generators of a laser system, as well as to separately control each gas discharge chamber, such that both the required bandwidth and pulse energy parameters can be optimized. Using a master oscillator (MO), for example, an extremely tight spectrum can be generated for high-numerical-aperture lenses at low pulse energy. A power amplifier (PA), for example, can be used to intensify the light, in order to deliver the power levels necessary for the high throughput desired by the chip manufacturers. The MOPA concept can be used with any appropriate laser, such as KrF, ArF, and $F_2$-based lasers. Further, a MOPA system can utilize separate switch/pulser systems for each discharge chamber (for the MO and the PA), but the use of separate switch/pulser systems typically leads to problems with synchronization, as controlling the timing between the parallel systems can be difficult.

Systems and methods in accordance with various embodiments of the present invention can overcome deficiencies in existing laser systems by providing precise timing control for a gas discharge chamber, or for multiple discharge chambers. Precise timing control can be obtained using a trigger ionization approach. For multiple chambers, the trigger ionization can be used for precise synchronization between chambers. The multiple chambers can be utilized in any appropriate arrangement, such as a master oscillator (MO) and power-amplifier (PA) arrangement, referred to herein as a "MOPA" arrangement.

Certain existing chamber configurations utilize a pre-ionization unit to pre-ionize the gas, but utilize the main electrodes to control the timing of the discharge. A typical pre-ionization approach utilizes a voltage from a main pulser circuit to ionize the gas in the chamber before discharge of the main electrodes. Such an approach is limited by the timing of the main discharge, which can vary on the order of about 10–20 ns even when using advanced control circuitry. Systems and methods in accordance with various embodiments of the present invention can overcome this deficiency by controlling the timing of the ionization separate from the charging of the main discharge electrodes, as the timing of the ionization in this manner can be more tightly controlled, and using the tightly-controlled ionization to control the timing of the discharge. The trigger ionization can be applied after the charging of the main discharge electrodes, depending upon the configuration of the laser system. A separate ionization circuit can be used for the trigger ionization, which can obtain tighter control. Since ionization of the laser gas can consume relatively small amounts of energy, such as on the order of about 1.0–10.0 mJ at about 2.0–6.0 kV, an ionization circuit can be based on a fast, high-voltage, solid state switch that is virtually free of jitter. An example of such a switch is a stack of FET transistors, such as a stack of model HTS 121-80 transistors available from Behlke Electronics of Kronberg, Germany. A typical rise time of the output voltage in such a switch is less than 10 ns, and the timing of the switch can be controlled to within about 1 ns, providing a much tighter control over the timing of the discharge. The timing of the trigger ionization can be controlled by an electronic control module in some embodiments, with switches of the module for each channel being timed off the main trigger pulse. Alternatively, the switches for each channel can be timed off photodetector output produced by UV emission of one of the chambers. A portion of a UV emission from one chamber also can act as an ionizing trigger for other chambers. When the timing of subsequent discharges is based on the main trigger pulse or optical output, a significant advantage can be obtained relative to existing systems, as the timing requirements for the main discharge can be relatively relaxed. Another significant advantage is the ability to utilize a common pulser for all chambers, without the need for active control of timing. The precise timing can be taken care of through a timing of a trigger ionization, which can be controlled deterministically.

FIG. 1 shows a laser system 100 utilizing a common solid state pulser component 102. The pulser component can include a single storage capacitor, as well as a single solid state switch and a single step-up transformer. The pulser component can also include a number of initial compressor stages. The pulser component 102 can be used to supply first and second discharge voltages to separate laser tubes or discharge chambers 104, 106. Two chambers are shown in the Figure, although additional chambers can be included as well that receive additional discharge voltages from the common pulser component 102. The discharge voltages can be supplied using separate channels, with each channel containing a separate final compressor component 108, 110. Each final compressor component can include several compressor stages, such as on the order of five compressor stages. A number of initial compressor stages, such as on the order of three initial compressor stages, can be combined in the common pulser component 102. Since the majority of jitter between channels can occur in the first several compressor stages for each channel, using a common pulser component can allow these first several stages to be combined into a single set of compressor stages, eliminating the jitter between channels that would otherwise result from separate stages. It still can be necessary to separate at least the final compressor stages for each channel, if not the last few stages for each channel, in order to decouple the discharges and/or isolate the discharge chambers 104, 106 from one another. The discharge chambers can be in a MOPA configuration, utilizing a separated master oscillator and power amplifier. A high voltage level can be related to the trigger delay, due to a hold-off time in the pulser. The hold-off time can be determined by a magnetic assist component and magnetic pulse compression stages of the pulser.

In a common pulser component 102, such as that of FIG. 1, the same voltage can be used and transferred to laser discharge chambers for each of two channels, such that the difference in trigger-to-pulse delays between the two discharges can be controlled with relative precision. Moreover, since one or more of the compressor stages are common to both channels, the uncontrolled difference can be further reduced. Since timing pulses are formed in the same sequence of components, the timing jitter between compressed pulses input to the different chambers can be minimal. Final compressor stages 108, 110 can be used to control a delay difference, but can operate on a faster time scale than the initial stages. Other parameters can affect the delay, such as the temperature of the various elements in the pulser circuit. A change in temperature can manifest itself in a slow drift of the delay. Analysis of the trigger to light delay, delay drifts, and jitter behavior can show a variety of parameters which influence the resulting light pulse.

While stabilization of the average temperature can be straightforward, localized heating effects in critical components can still be significant. These effects can be separated into effects occurring on a pulse-to-pulse basis, and effects requiring a much slower time scale, such as on the order of seconds or even minutes. Additionally, the main delay changes can happen in the pulser, such that only a small variation of the delay remains in the laser chamber. The use of a common pulser can eliminate a majority of the delay variation, and can minimize the difference between the delays of each channel.

Some existing systems utilize a common source of energy for separate channels. An existing laser system can utilize a common single switch arrangement, where the switch can be a thyratron, and in conjunction with the thyratron a magnetic switch control (MSC) can be used to further control the pulse width. Such an approach suffers from reliability problems due to the relatively short lifetime of the components, as well as speed limitations of the thyratron. The limited lifetime of a thyratron can significantly increase system cost and downtime, both of which are crucial for industrial applications. The embodiment of FIG. 1 overcomes this deficiency by utilizing a shared solid state switch, such as an IGBT (Insulated gate, bi-polar transistor), to cause the discharge of voltage stored on a capacitor. A solid state switch is very reliable, but can be too slow for excimer-type applications. In order to compensate for the longer switching time, pulse compression stages can be used. The pulse compression stages of a common pulser component in such an embodiment can determine the pulse width of the electrical pulse which is applied to the final compression stages.

The common power supply can be constructed from one or more power supplies connected in parallel, such as in a "master-slave" configuration, which can provide the voltage and charge for the laser pulse within the required time, such as between the consecutive pulses. Such a power supply can be obtained by Lambda EMI, where model LC203 has been tested in pulsed operation up to 6 kHz. The common storage capacitor can hold the charge until a trigger pulse is received and the IGBT switches the stored energy into a primary winding of the common transformer. A magnetic assist inductor can be used in a primary loop of the transformer to control current rise time. The signal can be transformed with suitable step-up ratio of about 20, for example, and can charge a common capacitor. A saturable inductor can hold off this voltage, preventing charging of the common capacitor until a hold-off time is reached. In this manner, these components form a pulse compression stage in the common pulser component. Depending on the specific design requirements, additional pulse compression stages can be added to further modify the electrical pulse output by the common pulser.

An electrical pulse from the common pulser component can be input at node 112 into two final compression stages 108 and 110. Each of the final compression stages can utilize additional pulse compression stages to further modify the electrical pulse input to the MO and/or PA. Final compression stage 108 outputs an electrical pulse to a first gas discharge unit 104. In a MOPA system the first gas discharge unit 104 would be the master oscillator component. Final compression stage 110 outputs an electrical pulse to a second gas discharge unit 106, which in a MOPA system would correspond to a power amplifier. During the transfer of the pulse through the final compression stages, each pulse can be further compressed to show a fast rise time of about 50 ns on the respective peaking capacitors.

In operation the master oscillator can generate a relatively lower power output beam as a result of electrical charge stored on the peaking capacitor being discharged through the main electrodes 114 of gas discharge unit 104. This beam can be transmitted to the gas discharge unit 106 of the power amplifier, wherein the energy of the beam output by the master oscillator can be amplified. The gas discharge unit 106 receives an electrical pulse from final compression stage 110.

The embodiment of FIG. 1 can utilize a common electronic control module 116, which can include inputs for both fast and slow control loops. These inputs can accept signals from devices such as photo-detectors, voltage dividers of storage capacitors, core magnetization sensors, and temperature sensors. For instance, a photodetector can generate a signal in response to an emission from discharge chamber 104, which can indicate the time at which a discharge or light pulse occurs in discharge unit 104. It should be noted that different types of devices or circuits can be used to detect a discharge in a master oscillator, such as a pick off loop or other electrical sensor, to detect the actual discharge from a peaking capacitor. Such a sensor can be used to detect the discharge of the peaking capacitor and/or the emission of a light pulse from the master oscillator.

A TDC (time-to-digital converter) can be used to determine a time difference between the discharge in a discharge unit and the input of a trigger pulse from a trigger pulse unit. A gas discharge unit also can include a device for sensing when an electrical pulse is discharged in the gas discharge unit. Such a device can be a pick up loop inductor capable of sensing when an electrical pulse is discharged from a peaking capacitor. Other electrical devices also could be used to determine when this discharge occurs. Based on information from a TDC for each channel, the electronics control module can determine a difference in time between the discharges in discharge units 104 and 106. The electronic control module then can adjust the timing of the discharges. In typical operation it can be desirable to provide a delay between the discharges of a master oscillator and a power amplifier. Such a delay can be, for example, a delay on the order to about 10 to 30 ns. The delay can have very low jitter, such as better than 1 ns peak-to-peak, between the discharge of a master oscillator and power amplifier. This delay can be necessary in certain embodiments for propagation of the pulse between the oscillator and amplifier, as well as pulse evolution in the master oscillator.

The electronic control module 116 also can be used to control the timing of a trigger ionization of gases in each discharge chamber 104, 106. By controlling this trigger ionization, the precise timing of the actual discharges of each chamber can be more finely controlled. A system such as that shown in the embodiment of FIG. 1 can utilize a common trigger ionization circuit contained within the electronic control module, or can use separate trigger ionization circuits controlled by the electronic control module, in order to use the trigger ionization to control discharge timing. Each ionization control can include, for example, a high voltage power supply or high voltage pulse generator 118, 120 in electrical communication with an ionization element or electrode 122, 124 in the respective discharge chamber 104, 106. There can be one pulse generator for each discharge chamber in the system. Other ionization configurations are possible, such as separate ionization circuits in series with a high frequency transformer, multiple such circuits in series, or a single such circuit, in order to obtain the appropriate voltage. A trigger ionization circuit, which can be part of the electronic control module, can include a low power solid state switch, which can be much faster than a high-power IGBT, and can provide a quick burst on a corona rod, for example. While the discharge timing of an excimer laser can be determined by the applied voltage, a high quality and uniform discharge only can occur when a suitable level of ionization is present in the discharge chamber. Proper ionization of the gas can produce a sufficient level of electrons, ions, and charged particles to start an avalanche gas discharge in the entire volume of a discharge gap. These separate ionization modules can be controlled by an electronic control module 116 that is part of, or in communication with, the laser system.

Ensuring sufficient ionization can provide for a "fine" control over the timing of a discharge. This fine control can be used in a MOPA system to tightly synchronize the emission of an optical pulse in a master oscillator to the maximum optical gain situation in the power amplifier. Even if the timing differences between main discharge pulses arriving at each chamber 104, 106 are minimized, it is possible to further fine tune the timing by ensuring that the trigger ionization pulses for each chamber arrive at the appropriate times. Firing a trigger ionization pulse after the main electrodes are charged can ensure that the actual discharge from each chamber occurs with a controlled timing or delay. Even if the charging of the main discharge electrodes can vary on the order of about 10 ns, the trigger ionization can be fired after this period of potential variation in order to more accurately control the timing of the discharge. Since the timing of the trigger ionization can be controlled to within about 1 ns, the timing of the discharge then also can be controlled to within 1 ns even if the charging of the main electrodes varies by 10 ns. The electronic control module can generate appropriate delay signals, seen as "Delay 1" and "Delay 2" in the Figure, such that the pulse generators 118, 120 for the trigger ionization fire at the appropriate time for each channel, after the arrival of the electrical or main voltage pulse, in order to provide sufficient ionization for discharge. The trigger ionization also can be used to control a fixed delay necessary between chambers, such as in a MOPA configuration. In an exemplary approach, the ionization can be obtained using a corona discharge component that provides sufficient ionization after arrival of the main voltage pulse. The design and configuration of a corona rod used for trigger ionization in accordance with various embodiments of the present invention can utilize any of a number of corona rod configurations that are presently used in conventional pre-ionization approaches, such as described in U.S. patent application Ser. No. 10/696,979, filed Oct. 30, 2003. The result of this ionization is a precise timing of the gas breakdown close to the point where the peaking capacitors are charged to a maximum voltage.

The circuitry for the trigger ionization can be separated from the circuitry for the main discharge pulse, such that the timing of the ionization can be controlled independently. The discharges can be synchronized to a higher accuracy than in existing systems, provided that the trigger ionization pulse timing is more precisely controlled than the timing of the main voltage pulse. An advantage of such an approach lies in the fact that requirements on the timing of the main discharge voltage pulse can be greatly reduced. The switching of the ionization can require a fairly low amount of power, such as on the order of tens of Watts or less, such that a fast pulsed source of high voltage can be used without multiple stages of compression and the associated delay uncertainty. Such a circuit can have sufficiently low inductivity and stray capacity, however, in order not to produce displacement current through the corona rod as the voltage on the main discharge electrode rises. A separate circuit providing the trigger ionization can utilize a high frequency pulse transformer having sufficient isolation against the 40 kV cathode potential.

Figure 2:
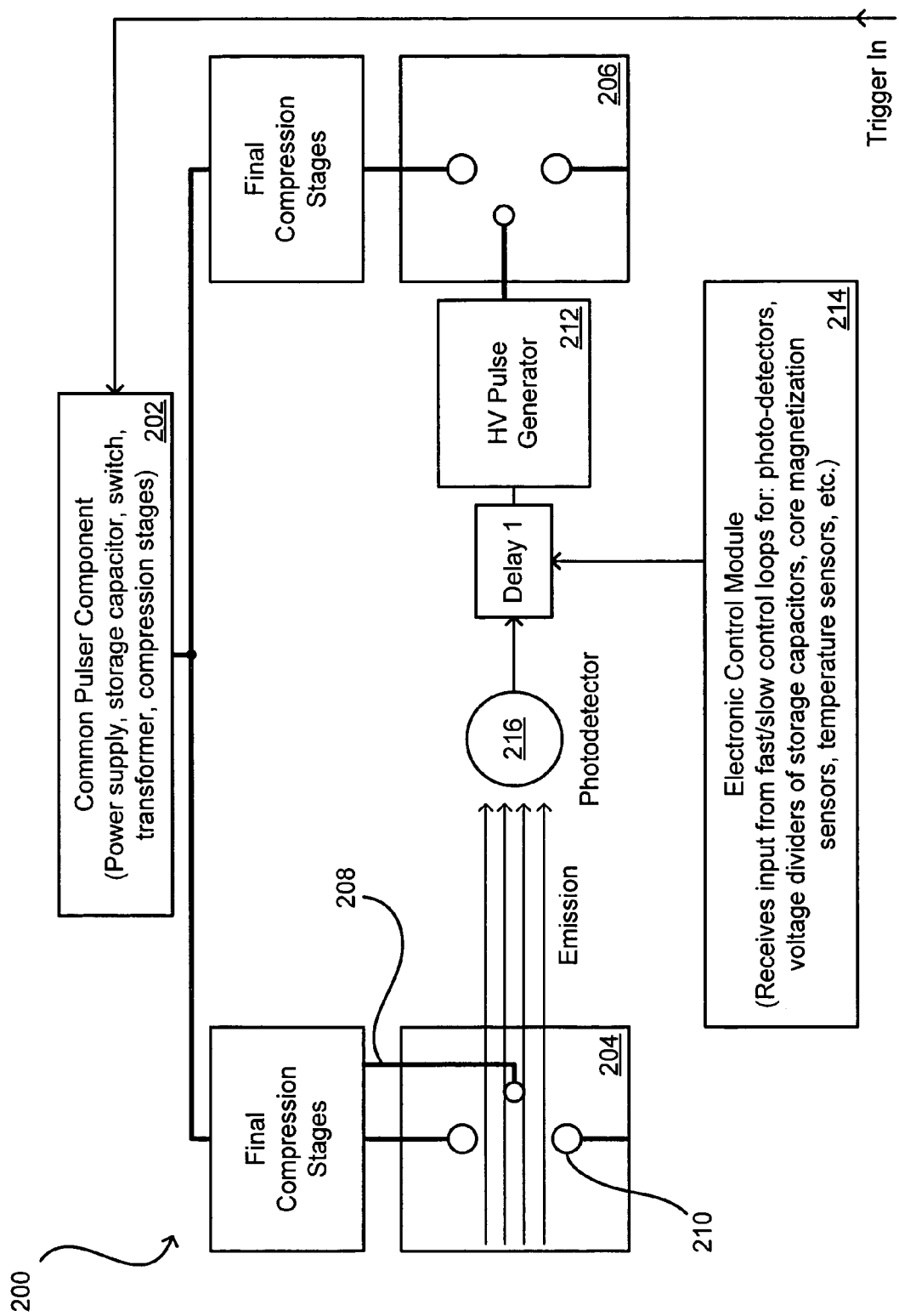
FIG. 2 is a diagram of a multi-chamber laser system in accordance with a second embodiment of the present invention.

FIG. 2 shows a laser system 200 in accordance with a second embodiment, which utilizes a common pulser component 202 similar to that of FIG. 1. In this embodiment, however, the trigger ionization is not timed using separate high-voltage pulse generators for each channel. Instead, a pre-ionization electrode 208 of the first discharge chamber 204 is driven by the same circuit that provides the discharge signal for the main electrodes 210 of the first chamber, using a conventional pre-ionization scheme. A separate preionization control signal, circuit, or control is not provided to the first discharge chamber, or master oscillator. This approach is more simplistic, but results in the emission of an optical pulse in the master oscillator having a timing variation on the order of about 10 ns with appropriate control circuitry. A photodetector 216 can be positioned to detect the emission of a light pulse from the first discharge chamber 204, which can be used to provide a timing signal to a high voltage pulse generator 212 for the ionization unit of the second discharge chamber 206, or power amplifier. The high voltage pulse generator then can generate a trigger ionization in the amplifier chamber with a delay that is based on the emission of the light pulse in the oscillator chamber. In this way, the relative timing between chambers can be tightly controlled to within about 1 ns, independent of the variation of the timing of the emission of the optical pulse relative to the discharge signal provided by the common pulser component 202. The electronic control module can be used in conjunction with the signal from the photodetector to provide an optimal delay between the emission of the light pulse in the oscillator and the subsequent trigger ionization, and discharge, in the amplifier. The "optimal" delay used between chambers can vary slightly, depending at least in part on operating parameters such as may include repetition rate and power. If more than two chambers are used, the photodetector can measure an emission in a master chamber to be used in setting a delay for each additional chamber. UV emission from this master chamber can trigger a photodetector which, in turn, can start the HV pulse source for ionizing the other chambers, with an appropriate delay (shown as "Delay 1" in figures).

Figure 3:
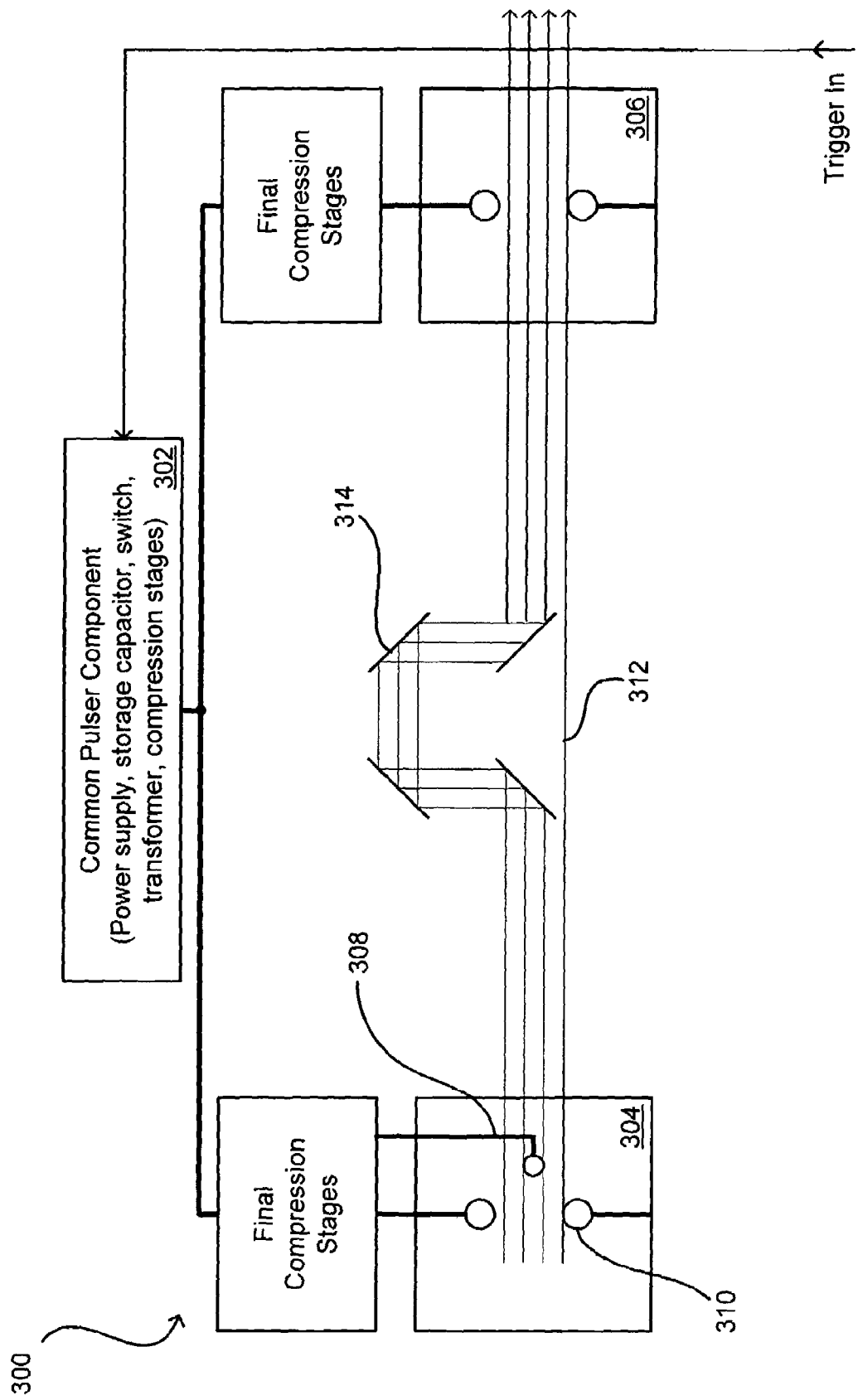
FIG. 3 is a diagram of a multi-chamber laser system in accordance with a third embodiment of the present invention.

FIG. 3 shows a laser system 300 in accordance with a third embodiment, which utilizes a common pulser component 302 similar to that of FIGS. 1 and 2. In this embodiment, however, separate ionization units are not utilized for the discharge chambers 304, 306. Instead, a pre-ionization electrode 308 of a pre-ionization unit of the first discharge chamber 304 is driven by the same circuit that provides the discharge signal for the main electrodes 310, using a conventional pre-ionization scheme, such as a corona rod or pin discharge pre-ionization scheme. A discharge chamber 306 other than the main discharge chamber 304 does not utilize either a pre-ionization unit or trigger ionization unit, but instead uses the emission 312 from the master chamber 304 as a trigger ionization pulse. When using the emission as a trigger ionization pulse, the required concentration of free electrons (typically on the order of $10^9$ per cubic centimeter) is generated due to direct and multi-photon absorption of UV light from the MO in impurities that are present in the lasers gas. For reference, see R. S. Taylor, "Preionization and Discharge Stability Study of Long Optical Pulse Duration UV-Preionized XeCl Lasers," Applied Physics B 41, pp. 1–24, 1986. In many such embodiments, favorable results can be obtained by introducing a small delay line 314 in the path of the optical pulse between the oscillator and amplifier. The delay line allows a small portion of the optical pulse to pass directly to the amplifier chamber, in order to act as an ionization trigger. The delay line holds the remainder of the optical pulse for an appropriate amount of time, such as on the order of 5–10 ns. Such an approach can ensure that the electrical discharge is fully developed in the amplifier chamber, and that the optical gain is maximized by the time the pulse to be amplified arrives. The main electrodes can be fully charged before the arrival of the ionization trigger. In embodiments without a delay line, a majority of the optical pulse can have passed through the chamber before the timing of the discharge. As the time it takes for the emission to pass between chambers should not vary significantly, there may be no need for an active control on the separation of the chambers, or length of the beam path. Such an approach can provide a much simpler design than the embodiments of FIGS. 1 and 2, but can be slightly tougher to implement in certain situations.

Figure 4:
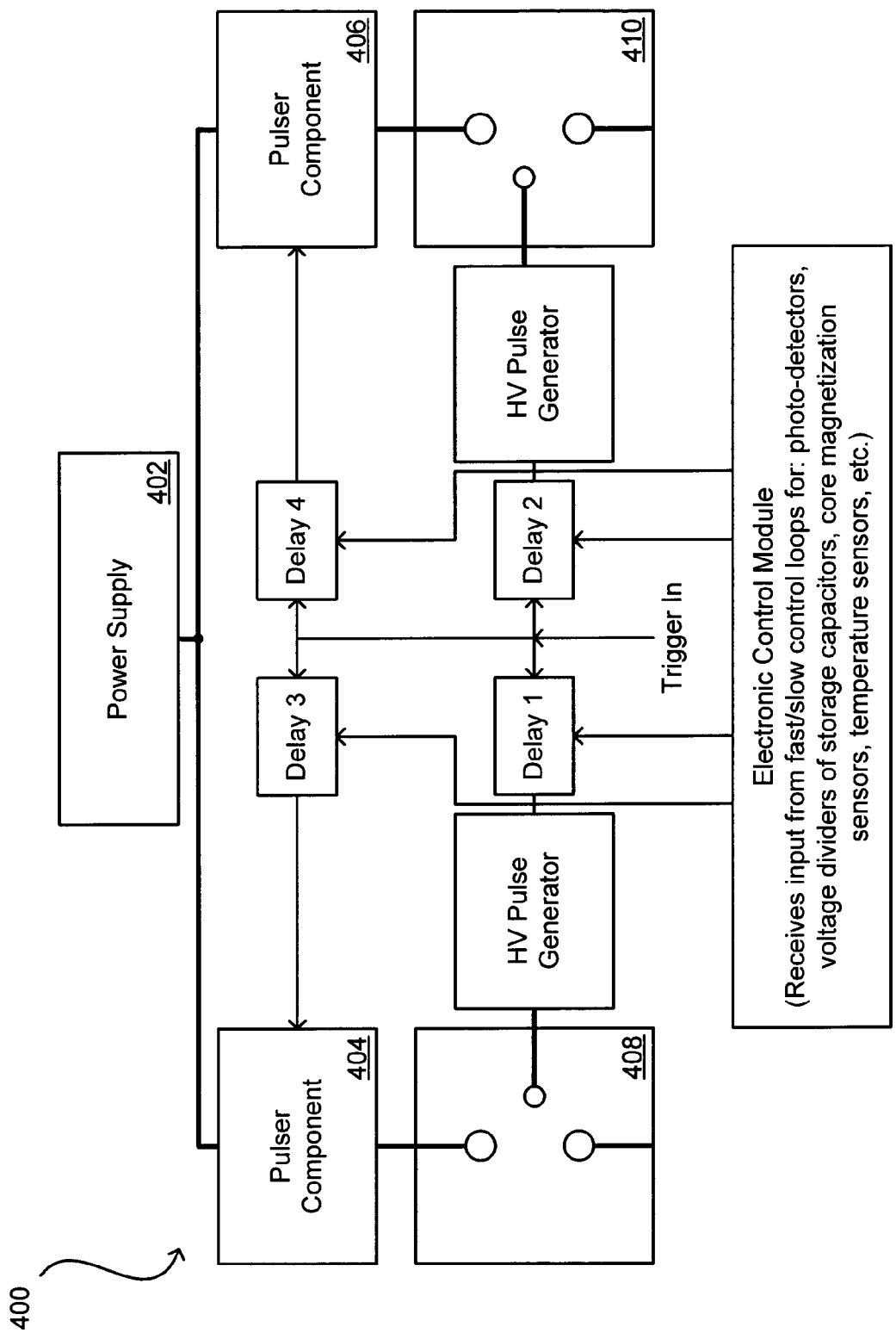
FIG. 4 is a diagram of a multi-chamber laser system in accordance with a fourth embodiment of the present invention.

FIG. 4 shows a laser system 400 in accordance with a fourth embodiment, which does not utilize a common pulser component as in the embodiments of FIGS. 1–3. Instead, this system utilizes only a common power supply 402, and possibly a single storage capacitor (not shown). Each channel can have a separate pulser component 404, 406, each pulser component including a solid state switch, transformer, and compression stage. Each channel also can have a separate storage capacitor, such as where a single common storage capacitor is not used. An advantage to such an arrangement is that each channel can be triggered separately, by the respective pulser component, which can provide greater flexibility in adjusting the relative timing of the main discharge pulse between discharge chambers 408, 410. The charging voltage can remain common for all channels, however, due to the use of the common power supply 402. The common charging voltage can reduce jitter that could otherwise be caused by high voltage fluctuations. An electronic control module can provide a delay signal to the high voltage pulse generators for generating a trigger ionization in each discharge chamber, as well as providing delay signals to each pulser component. For instance, the electronic control module can provide a delay signal (Delay 1) to the master discharge chamber in order to control the timing of the trigger ionization in the master oscillator chamber. A photodetector or other discharge/emission detector (not shown) can detect an emission or discharge in the master chamber 408, and can generate an appropriate delay signal (Delay 2) for the trigger ionization in a subsequent amplification chamber 410. A detector can detect a discharge in the second discharge chamber 410, and the electronic control module can use the signal from either or both of the detectors to generate delay signals (Delay 3 and Delay 4) for either or both of the pulser control modules 404, 406. In this case, the electronic control module can determine the amount of delay for the triggers in both pulsers, as well as those of trigger ionization pulse generators. These delays can be added to the time of the common external trigger, such as in FIG. 4.

Figure 5:
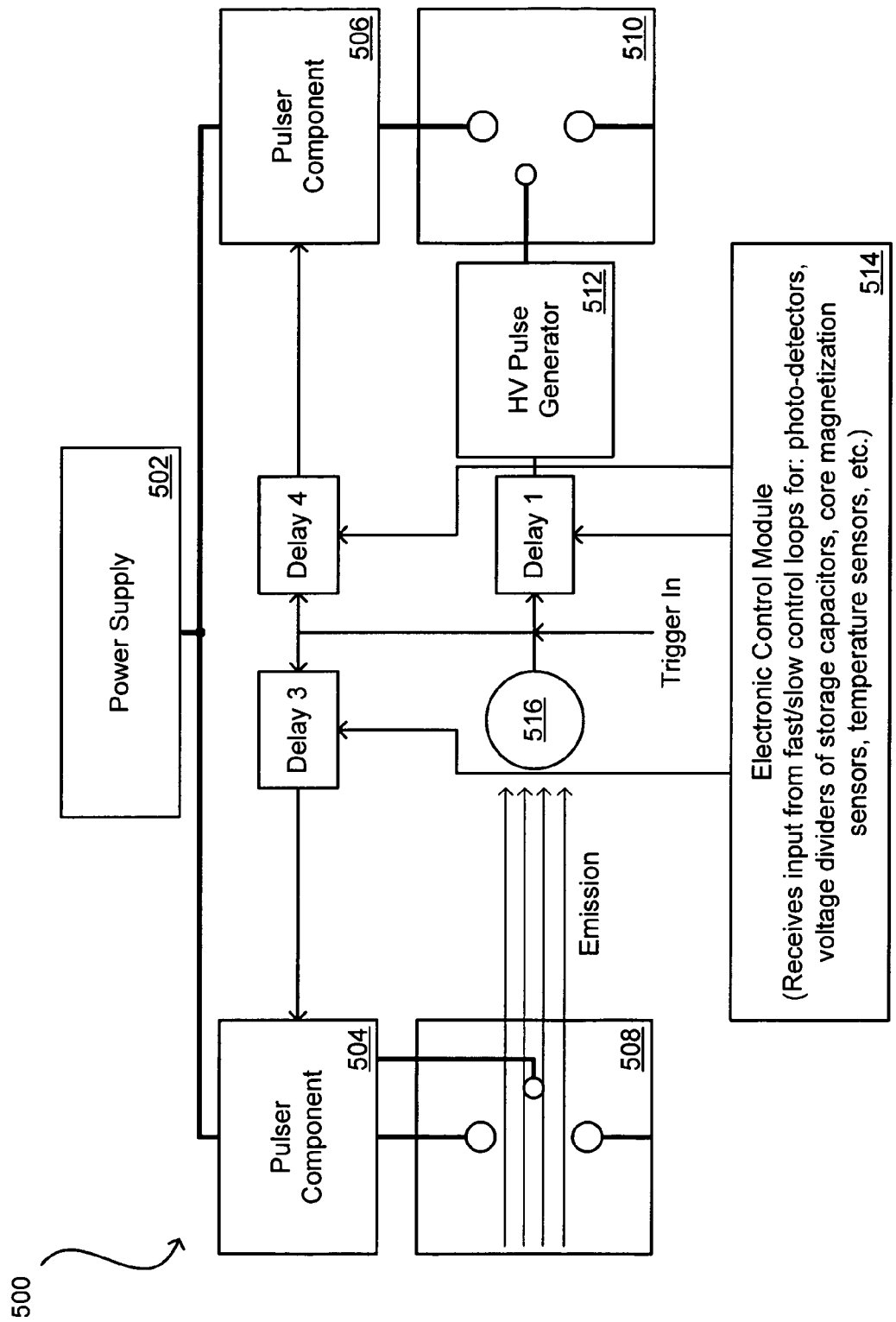
FIG. 5 is a diagram of a multi-chamber laser system in accordance with a fifth embodiment of the present invention.

FIG. 5 shows a laser system 500 in accordance with a fifth embodiment, which utilizes a common power supply 502 and separate pulser components 504, 506 for each discharge chamber 508, 510, as in the system of FIG. 4. In this system, however, a photodetector 516, or other discharge sensor, is positioned to detect a discharge or emission in the first discharge chamber 508. The photodetector can generate a discharge signal in response to the emission that can be sent to a pulse generator 512 for the second discharge chamber 510, as in the embodiment of FIG. 2, in order to generate an appropriately-timed trigger ionization discharge. An electronic control module can provide a delay signal to the high voltage pulse generator 512, to be used in conjunction with the discharge signal from the photodetector, as well as providing delay signals to each pulser component 504, 506. The electronic control module 514 can use information collected about the emissions and/or discharges of each chamber to generate delay signals for either or both of the pulser control modules 504, 506.

Figure 6:
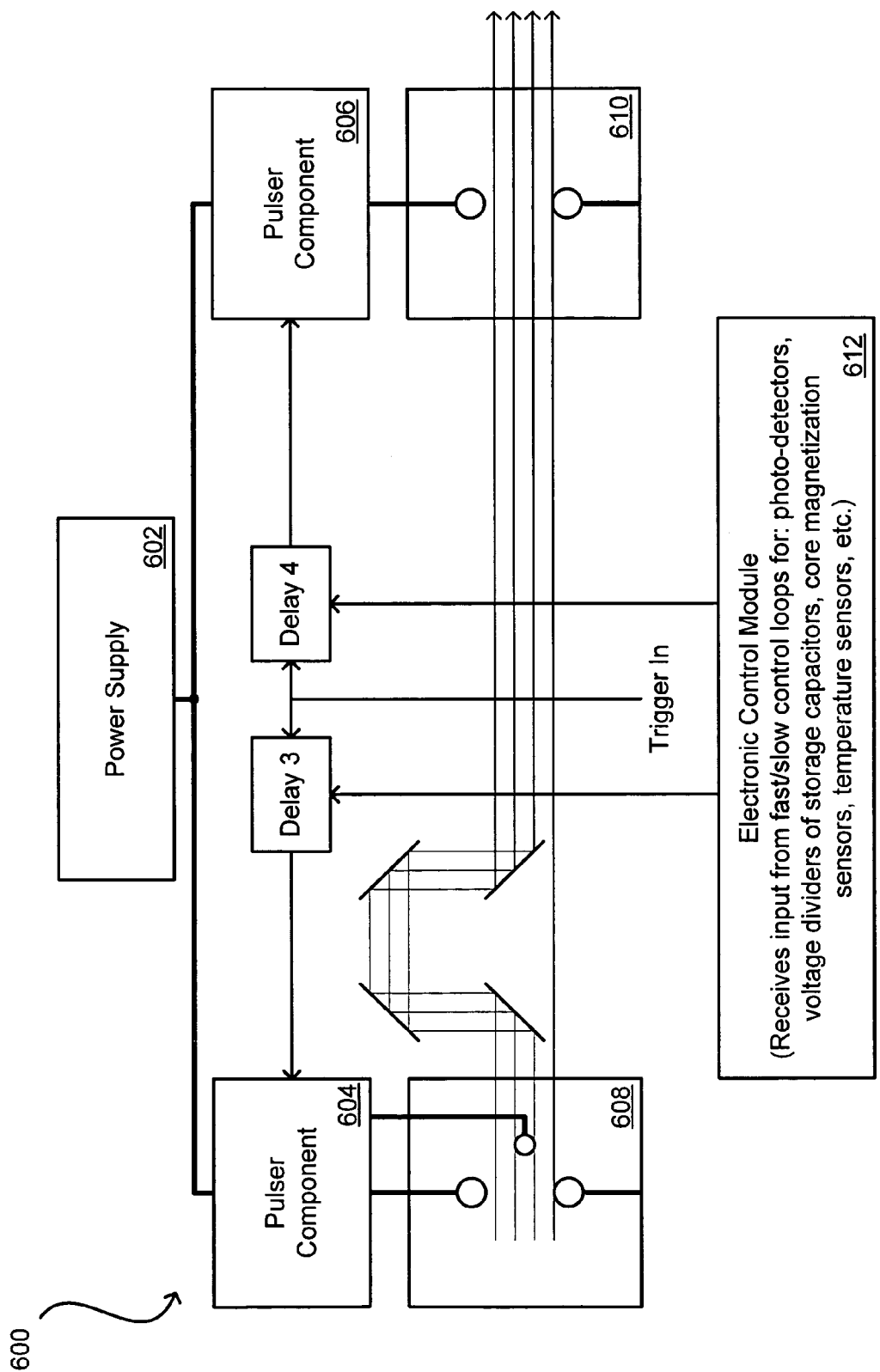
FIG. 6 is a diagram of a multi-chamber laser system in accordance with a sixth embodiment of the present invention.

FIG. 6 shows a laser system 600 in accordance with a sixth embodiment, which utilizes a common power supply 602 and separate pulser components 604, 606 as in FIGS. 4 and 5. In this system, however, the emission from the master chamber 608 is used as an ionization trigger for the second chamber 610, as in the system of FIG. 3. There is no pre-ionization circuit for either chamber, and a conventional pre-ionization approach is used for the master chamber. Further, a photodetector or other discharge or emission detector is not used for trigger ionization in the second chamber. An electronic control module can provide delay signals to each pulser component 604, 606. The electronic control module 612 can use a signal from a detector for either chamber in order to generate delay signals for either or both of the pulser control modules 604, 606.

Figure 7:
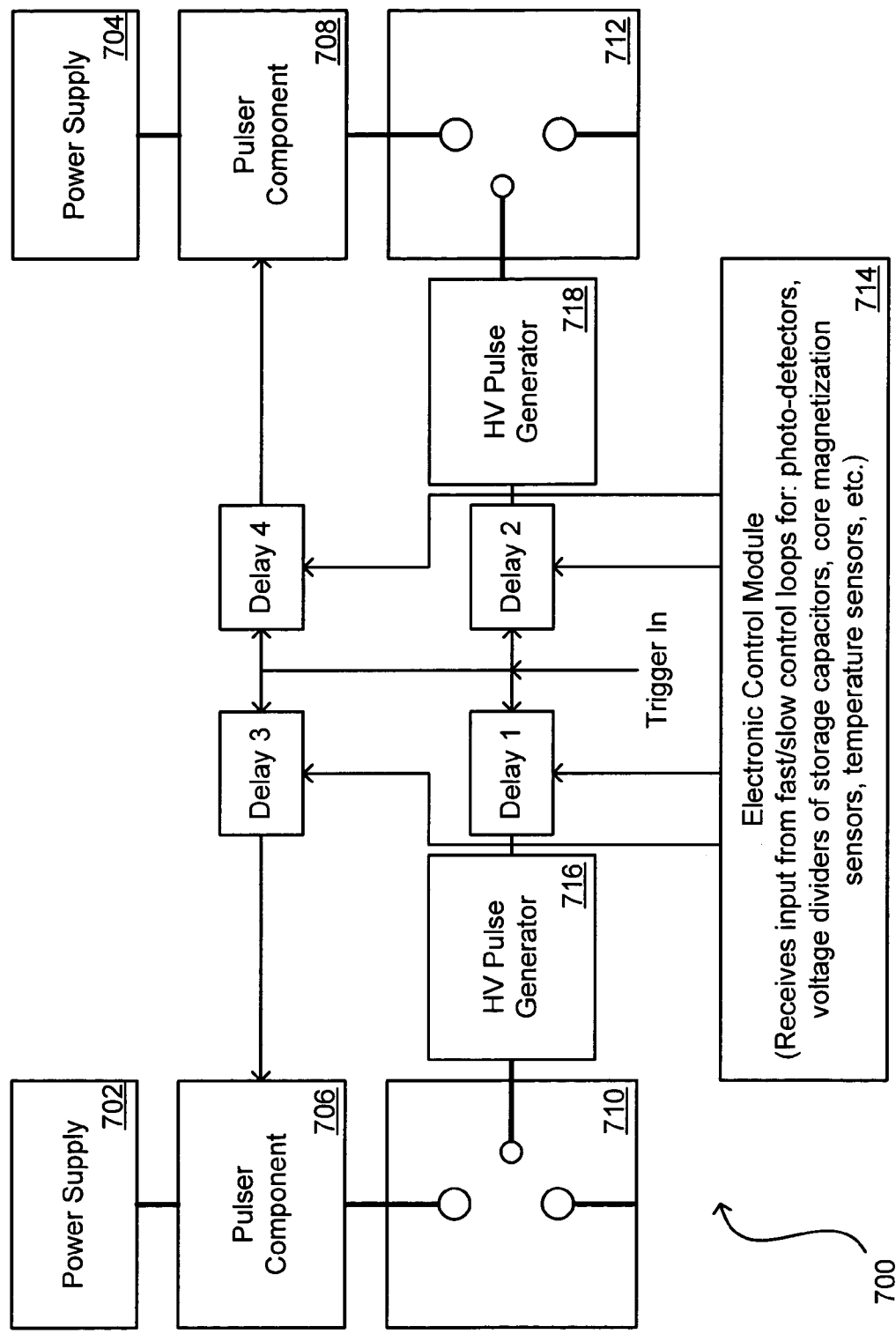
FIG. 7 is a diagram of a multi-chamber laser system in accordance with a seventh embodiment of the present invention.

FIG. 7 shows a laser system 700 in accordance with a seventh embodiment 700, which not only utilizes separate pulser modules 706, 708 for each channel, but also uses separate power supplies 702, 704. An advantage to such an approach is that separate power supplies and pulser components provide the flexibility to separately adjust the high voltages for each channel, allowing for a separate optimization of each chamber. A trade-off for such an approach is the potential for increased timing jitter of the main discharge pulse between the chambers 710, 712. An electronic control module 714 can provide a delay signal for high voltage pulse generators 716, 718 for each discharge chamber, in order to time the trigger ionization, as well as providing delay signals to each pulser component 706, 708. For instance, the electronic control module 714 can provide a delay signal (Delay 1) to the pulse generator of the master discharge chamber in order to provide the trigger ionization for the gas in the chamber. A discharge/emission detector (not shown) can detect an emission or discharge in the master chamber 710, which can cause the electronic control module to generate an appropriate delay signal for the high voltage pulse generator for a subsequent chamber 712 in order to trigger the ionization in the subsequent chamber. A detector can detect a discharge or emission in the second discharge chamber 712, and the electronic control module 714 can use the signal from either or both of the detectors to generate delay signals for either or both of the pulser control modules 706, 708.

Figure 8:
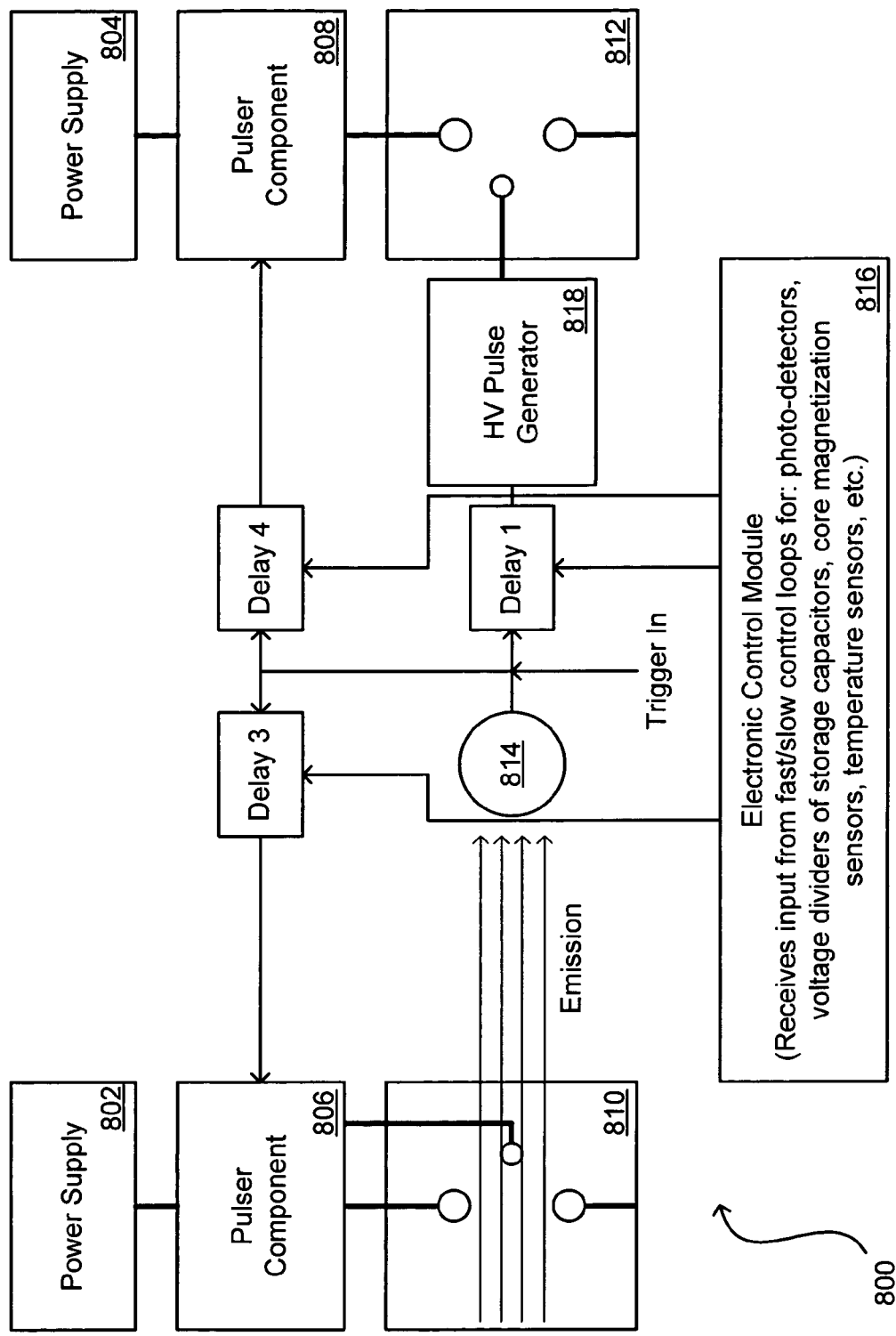
FIG. 8 is a diagram of a multi-chamber laser system in accordance with an eighth embodiment of the present invention.

FIG. 8 shows a laser system 800 in accordance with an eighth embodiment, which also utilizes separate power supplies 802, 804 and pulser components 806, 808 for each channel. In this system, however, a photodetector is positioned relative to the first discharge chamber 810 such that the photodetector 814 can detect an emission from the chamber, which can be used to generate a delay signal for the second discharge chamber 812, as in the embodiment of FIGS. 2 and 5, in order to time the trigger ionization. An electronic control module 816 can provide a delay signal to the high voltage pulse generator 818, as well as providing delay signals to each pulser component 806, 808. The electronic control module 816 can use signals from detectors for both chambers to generate delay signals for either or both of the pulser control modules 806, 808.

Figure 9:
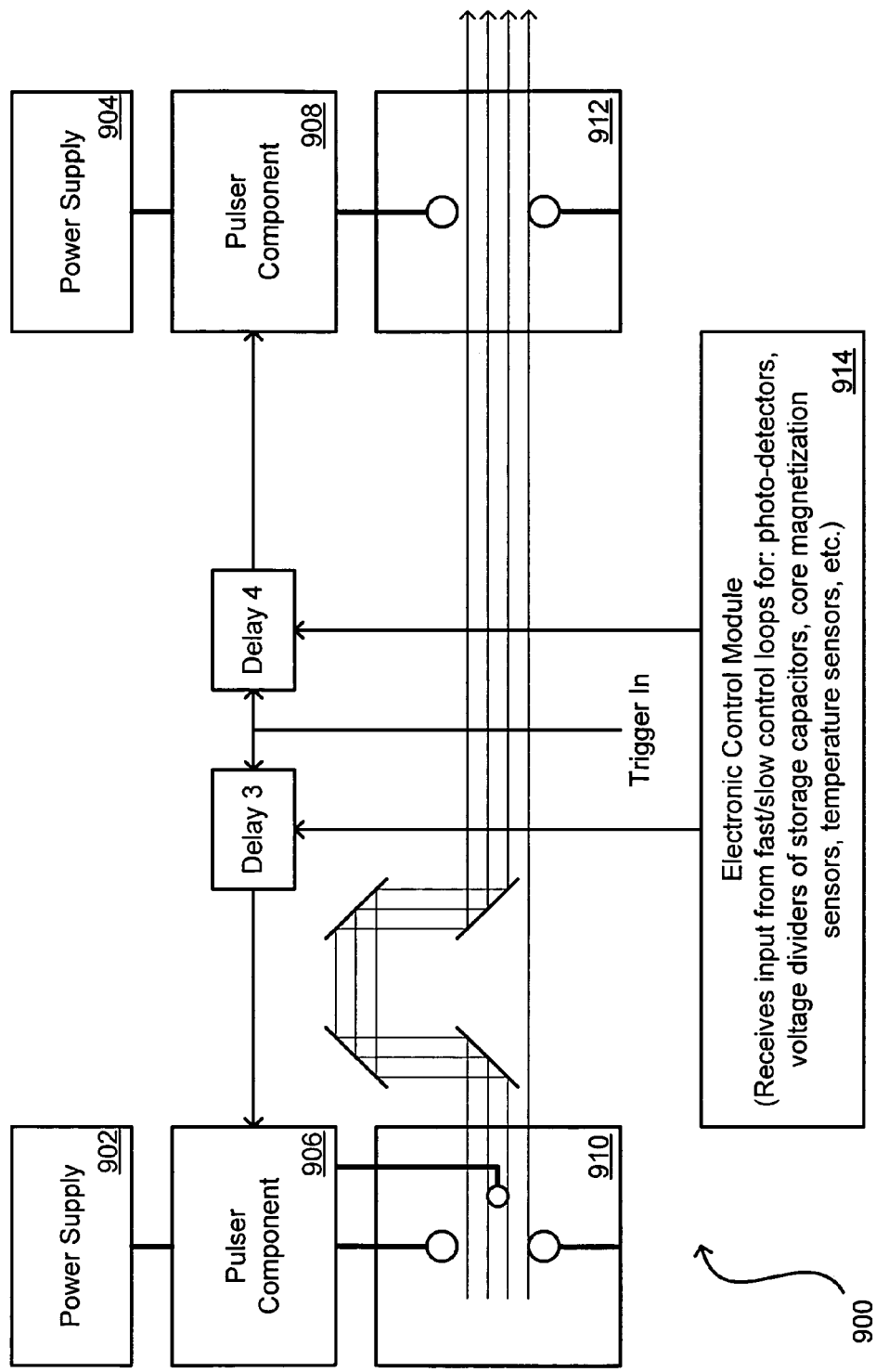
FIG. 9 is a diagram of a multi-chamber laser system in accordance with a ninth embodiment of the present invention.

FIG. 9 shows a laser system 900 in accordance with a ninth embodiment, which utilizes separate power supplies 902, 904 and pulser components 906, 908 for each channel. In this system, however, the emission from the master chamber 910 to is used to ionize the gas in the second chamber 912, as in the systems of FIGS. 3 and 6. There is not a separate pre-ionization circuit for either chamber, and a conventional pre-ionization approach is used for the master chamber. Further, no discharge or emission detector is used for timing the trigger ionization in the second chamber 912. An electronic control module 914 can provide delay signals to each pulser component 906, 908. The electronic control module 914 can use a signal from a detector for either chamber in order to generate delay signals for either or both of the pulser control modules 906, 908.

Figure 10:
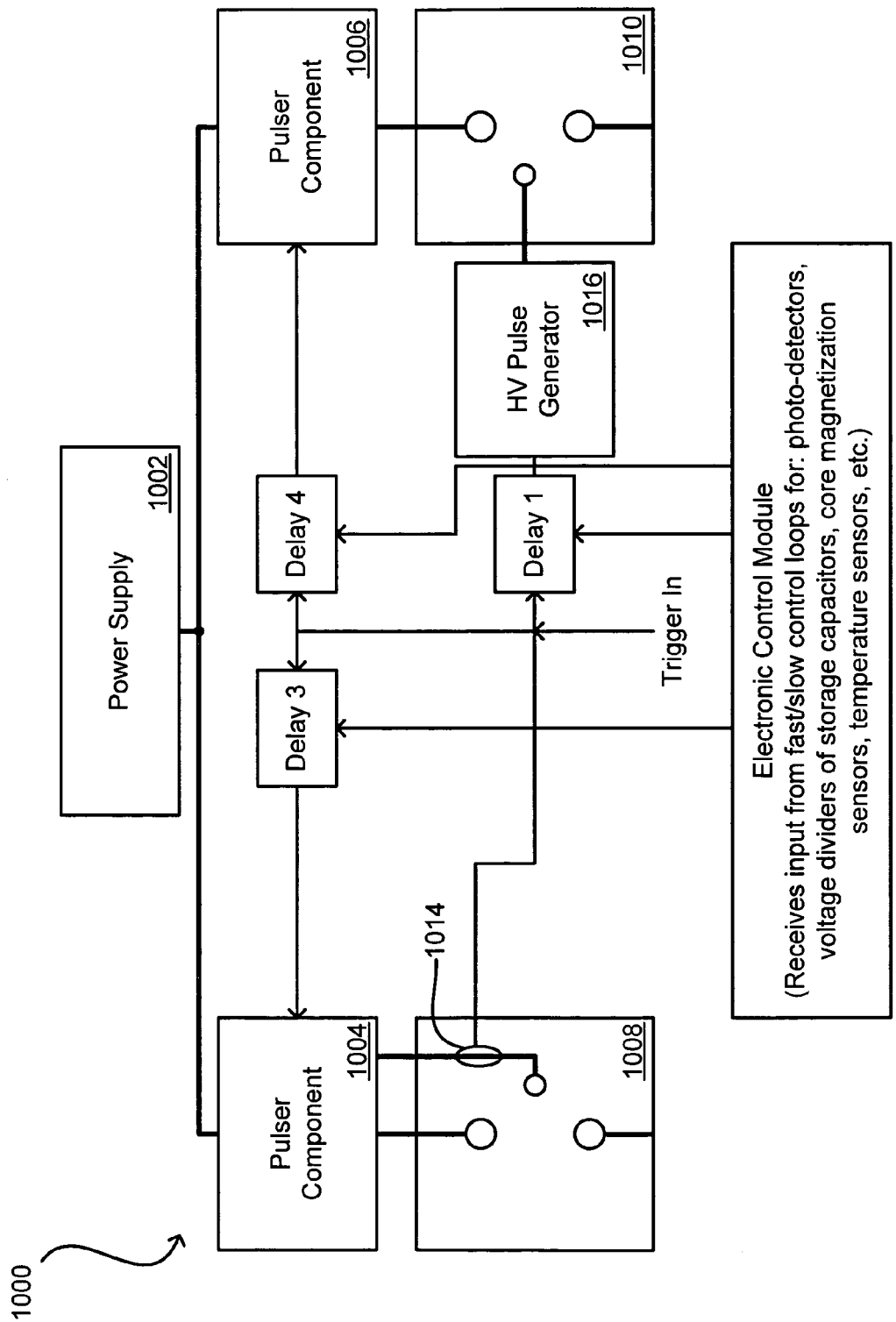
FIG. 10 is a diagram of a multi-chamber laser system in accordance with a tenth embodiment of the present invention.
Figure 11:
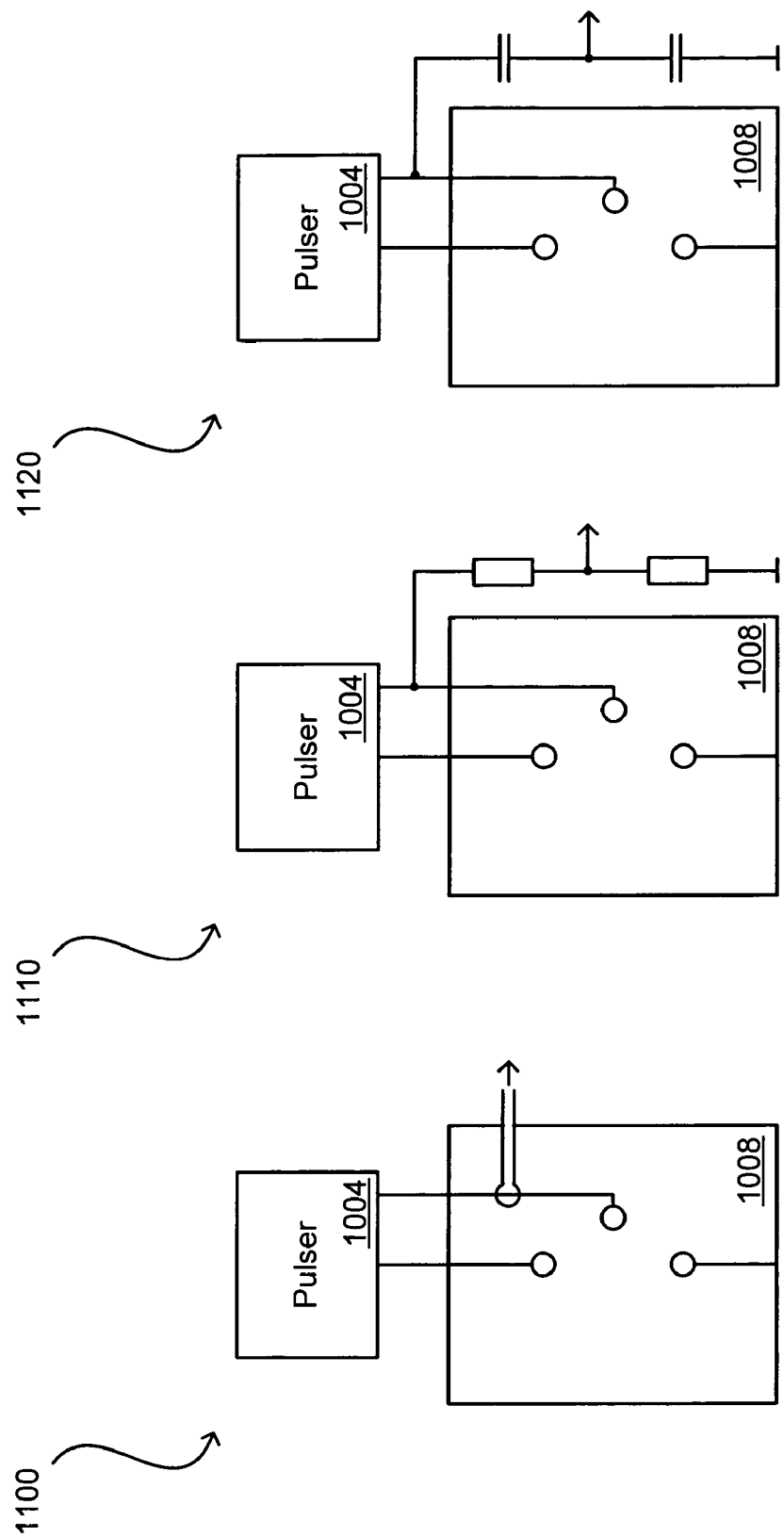
FIG. 11 is a diagram of voltage pick offs that can be used with the system of FIG. 10.

FIG. 10 shows a laser system 1000 in accordance with a tenth embodiment, which differs from the systems of FIGS. 1–9 in that an electrical pulse pick off 1014 from a conventional pre-ionization electrode in the master chamber 1008 can be used to generate the trigger ionization in the slave chamber or amplifier 1010. The pick off circuit can send a signal to high voltage pulse generator 1016 when the pre-ionization electrode in the master chamber 1008 receives a pre-ionization voltage from the pulser component 1004. Such an approach can be used to compensate for the fact that an optical gain pulse in the amplifier 1010 will be delayed with respect to the corresponding pre-ionization pulse, such as a delay on the order of approximately 50 ns. Therefore, either an optical pulse from the oscillator 1008 has to be sent through an optical delay line before entering the amplifier 1010 in order to account for the delay, such as described for example with respect to FIG. 3, or the trigger ionization for the amplifier 1010 has to fire before the optical pulse is emitted from the oscillator 1008. Since delaying the light pulse optically can be difficult, the timing of the trigger ionization for the slave chamber 1010 can be derived from a pre-ionization pulse preceding the emission of an optical pulse from the master chamber 1008, as there can be a near-constant time offset between the pre-ionization pulse and the emission of the optical pulse. The signal from the pick off can be derived from the rising edge of the voltage to the pre-ionization electrode in the oscillator 1008. FIG. 11 shows three approaches to a voltage pick off that can be used for the timing of the trigger ionization in FIG. 10. A first approach 1100 uses a device such as a little coil picking electromagnetic interference signal. In a second approach 1110, a resistive voltage divider is used to generate the trigger ionization signal. The approach of FIG. 1120 utilizes a capacitive voltage divider.

Overall Laser System

Figure 12:
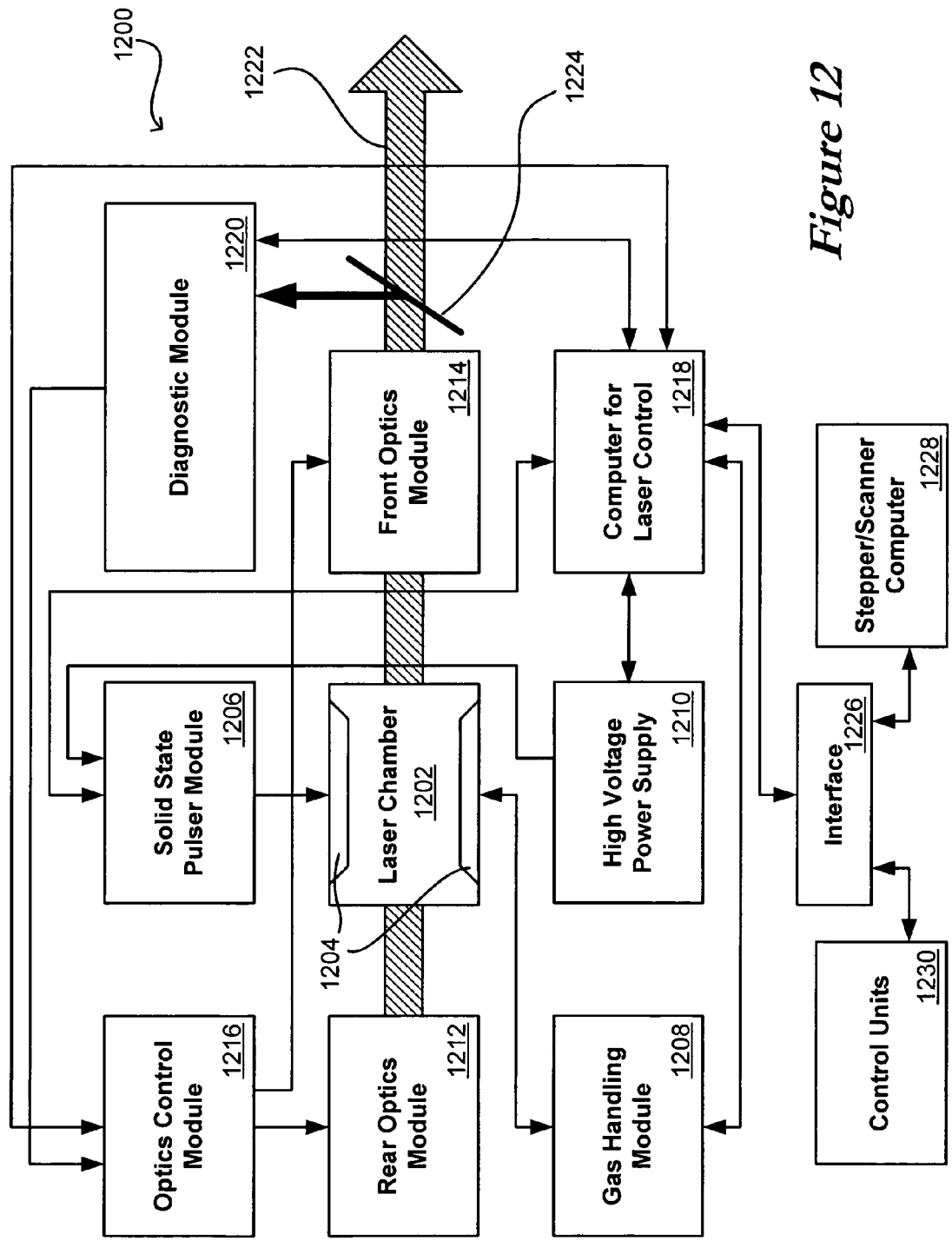
FIG. 12 is a diagram of an overall laser system that can be used in accordance with embodiments of the present invention.

FIG. 12 schematically illustrates an exemplary excimer or molecular fluorine laser system 1200 that can be used in accordance with various embodiments of the present invention. The gas discharge laser system can be a deep ultraviolet (DUV) or vacuum ultraviolet (VUV) laser system, such as an excimer laser system, e.g., ArF, XeCl or KrF, or a molecular fluorine ($F_2$) laser system for use with a DUV or VUV lithography system. Alternative configurations for laser systems, for use in such other industrial applications as TFT annealing, photoablation and/or micromachining, e.g., include configurations understood by those skilled in the art as being similar to, and/or modified from, the system shown in FIG. 12 to meet the requirements of that application.

The laser system 1200 includes a laser chamber 1202 or laser tube, which can include a heat exchanger and fan for circulating a gas mixture within the chamber or tube. The chamber can include a plurality of electrodes 1204, such as a pair of main discharge electrodes and one or more ionization electrodes or elements which can be connected with a solid-state pulser module 1206, or with separate modules or circuitry as described elsewhere herein. A gas handling module 1208 can have a valve connection to the laser chamber 1202, such that halogen, rare and buffer gases, and gas additives, can be injected or filled into the laser chamber, such as in premixed forms for ArF, XeCl and KrF excimer lasers, as well as halogen, buffer gases, and any gas additive for an $F_2$ laser. The gas handling module 1208 can be preferred when the laser system is used for microlithography applications, wherein very high energy stability is desired. A gas handling module can be optional for a laser system such as a high power XeCl laser. A solid-state pulser module 1206 can be used that is powered by a high voltage power supply 1210. Alternatively, a thyratron pulser module can be used. The laser chamber 1202 can be surrounded by optics modules 1212, 1214, forming a resonator. The optics modules 1212, 1214 can include a highly reflective resonator reflector in the rear optics module 1212, and a partially reflecting output coupling mirror in the front optics module 1214. This optics configuration can be preferred for a high power XeCl laser. The optics modules 1212, 1214 can be controlled by an optics control module 1216, or can be directly controlled by a computer or processor 1218, particularly when line-narrowing optics are included in one or both of the optics modules. Line-narrowing optics can be preferred for systems such as KrF, ArF or $F_2$ laser systems used for optical lithography.

The processor 1218 for laser control can receive various inputs and control various operating parameters of the system. A diagnostic module 1220 can receive and measure one or more parameters of a split off portion of the main beam 1222 via optics for deflecting a small portion of the beam toward the module 1220. These parameters can include pulse energy, average energy and/or power, and wavelength. The optics for deflecting a small portion of the beam can include a beam splitter module 1224. The beam 1222 can be laser output to an imaging system (not shown) and ultimately to a workpiece (also not shown), such as for lithographic applications, and can be output directly to an application process. Laser control computer 1218 can communicate through an interface 1226 with a stepper/scanner computer, other control units 1228, 1230, and/or other, external systems.

The processor or control computer 1216 can receive and process parameter values, such as may include the pulse shape, energy, ASE, energy stability, energy overshoot (for burst mode operation), wavelength, spectral purity, and/or bandwidth, as well as other input or output parameters of the laser system and/or output beam. The processor can receive signals corresponding to the wavefront compensation, such as values of the bandwidth, and can control wavefront compensation, performed by a wavefront compensation optic in a feedback loop, by sending signals to adjust the pressure(s) and/or curvature(s) of surfaces associated with the wavefront compensation optic. The processor 1216 also can control the line narrowing module to tune the wavelength, bandwidth, and/or spectral purity, and can control the power supply 1208 and pulser module 1204 to control the moving average pulse power or energy, such that the energy dose at points on a workpiece is stabilized around a desired value. The laser control computer 1216 also can control the gas handling module 1206, which can include gas supply valves connected to various gas sources.

The laser chamber 1202 can contain a laser gas mixture, and can include one or more ionization electrodes in addition to the pair of main discharge electrodes. The main electrodes can be similar to those described at U.S. Pat. No. 6,466,599 B1 (incorporated herein by reference above) for photolithographic applications, which can be configured for a XeCl laser when a narrow discharge width is not preferred.

The solid-state or thyratron pulser module 1206 and high voltage power supply 1210 can supply electrical energy in compressed electrical pulses to the ionization and/or main electrodes within the laser chamber 1202, in order to energize the gas mixture. The rear optics module 1212 can include line-narrowing optics for a line narrowed excimer or molecular fluorine laser as described above, which can be replaced by a high reflectivity mirror or the like in a laser system wherein either line-narrowing is not desired (XeCl laser for TFT annealling, e.g.), or if line narrowing is performed at the front optics module 1214, or a spectral filter external to the resonator is used, or if the line-narrowing optics are disposed in front of the HR mirror, for narrowing the bandwidth of the output beam.

The laser chamber 1202 can be sealed by windows transparent to the wavelengths of the emitted laser radiation 1222. The windows can be Brewster windows, or can be aligned at an angle, such as on the order of about 5°, to the optical path of the resonating beam. One of the windows can also serve to output couple the beam.

After a portion of the output beam 1222 passes the outcoupler of the front optics module 1214, that output portion can impinge upon a beam splitter module 1224 including optics for deflecting a portion of the beam to the diagnostic module 1220, or otherwise allowing a small portion of the outcoupled beam to reach the diagnostic module 1220, while a main beam portion is allowed to continue as the output beam 1220 of the laser system. The optics can include a beamsplitter or otherwise partially reflecting surface optic, as well as a mirror or beam splitter as a second reflecting optic. More than one beam splitter and/or HR mirror(s), and/or dichroic mirror(s) can be used to direct portions of the beam to components of the diagnostic module 1220. A holographic beam sampler, transmission grating, partially transmissive reflection diffraction grating, grism, prism or other refractive, dispersive and/or transmissive optic or optics can also be used to separate a small beam portion from the main beam 1222 for detection at the diagnostic module 1220, while allowing most of the main beam 1222 to reach an application process directly, via an imaging system or otherwise.

The output beam 1222 can be transmitted at the beam splitter module, while a reflected beam portion is directed at the diagnostic module 1220. Alternatively, the main beam 1222 can be reflected while a small portion is transmitted to a diagnostic module 1220. The portion of the outcoupled beam which continues past the beam splitter module can be the output beam 1222 of the laser, which can propagate toward an industrial or experimental application such as an imaging system and workpiece for photolithographic applications.

For a system such as a molecular fluorine laser system or ArF laser system, an enclosure (not shown) can be used to seal the beam path of the beam 1222 in order to keep the beam path free of photoabsorbing species. Smaller enclosures can seal the beam path between the chamber 1202 and the optics modules 1212 and 1214, as well as between the beam splitter 1224 and the diagnostic module 1220.

The diagnostic module 1220 can include at least one energy detector to measure the total energy of the beam portion that corresponds directly to the energy of the output beam 1222. An optical configuration such as an optical attenuator, plate, coating, or other optic can be formed on or near the detector or beam splitter module 1224, in order to control the intensity, spectral distribution, and/or other parameters of the radiation impinging upon the detector.

A wavelength and/or bandwidth detection component can be used with the diagnostic module 1220, the component including for example such as a monitor etalon or grating spectrometer. Other components of the diagnostic module can include a pulse shape detector or ASE detector, such as for gas control and/or output beam energy stabilization, or to monitor the amount of amplified spontaneous emission (ASE) within the beam, in order to ensure that the ASE remains below a predetermined level. There can also be a beam alignment monitor and/or beam profile monitor.

The processor or control computer 1218 can receive and process values for the pulse shape, energy, ASE, energy stability, energy overshoot for burst mode operation, wavelength, and spectral purity and/or bandwidth, as well as other input or output parameters of the laser system and output beam. The processor 1218 also can control the line narrowing module to tune the wavelength and/or bandwidth or spectral purity, and can control the power supply 1210 and pulser module 1206 to control the moving average pulse power or energy, such that the energy dose at points on the workpiece can be stabilized around a desired value. In addition, the computer 1218 can control the gas handling module 1208, which can include gas supply valves connected to various gas sources. Further functions of the processor 1218 can include providing overshoot control, stabilizing the energy, and/or monitoring energy input to the discharge.

The processor 1218 can communicate with the solid-state or thyratron pulser module 1206 and HV power supply 1210, separately or in combination, the gas handling module 1208, the optics modules 1212 and/or 1214, the diagnostic module 1220, and an interface 1226. The processor 1218 also can control an auxiliary volume, which can be connected to a vacuum pump (not shown) for releasing gases from the laser tube 1202 and for reducing a total pressure in the tube. The pressure in the tube can also be controlled by controlling the gas flow through the ports to and from the additional volume.

The laser gas mixture initially can be filled into the laser chamber 1202 in a process referred to herein as a "new fill". In such procedure, the laser tube can be evacuated of laser gases and contaminants, and re-filled with an ideal gas composition of fresh gas. The gas composition for a very stable excimer or molecular fluorine laser can use helium or neon, or a mixture of helium and neon, as buffer gas(es), depending on the laser being used. The concentration of the fluorine in the gas mixture can range from 0.003% to 1.00%, in some embodiments is preferably around 0.1%. An additional gas additive, such as a rare gas or otherwise, can be added for increased energy stability, overshoot control, and/or as an attenuator. Specifically for a $F_2$-laser, an addition of xenon, krypton, and/or argon can be used. The concentration of xenon or argon in the mixture can range from about 0.0001% to about 0.1%. For an ArF-laser, an addition of xenon or krypton can be used, also having a concentration between about 0.0001% to about 0.1%. For the KrF laser, an addition of xenon or argon may be used also over the same concentration.

Halogen and rare gas injections, including micro-halogen injections of about 1–3 milliliters of halogen gas, mixed with about 20–60 milliliters of buffer gas, or a mixture of the halogen gas, the buffer gas, and a active rare gas, per injection for a total gas volume in the laser tube on the order of about 100 liters, for example. Total pressure adjustments and gas replacement procedures can be performed using the gas handling module, which can include a vacuum pump, a valve network, and one or more gas compartments. The gas handling module can receive gas via gas lines connected to gas containers, tanks, canisters, and/or bottles. A xenon gas supply can be included either internal or external to the laser system.

Total pressure adjustments in the form of releases of gases or reduction of the total pressure within the laser tube also can be performed. Total pressure adjustments can be followed by gas composition adjustments if necessary. Total pressure adjustments can also be performed after gas replenishment actions, and can be performed in combination with smaller adjustments of the driving voltage to the discharge than would be made if no pressure adjustments were performed in combination.

Gas replacement procedures can be performed, and can be referred to as partial, mini-, or macro-gas replacement operations, or partial new fill operations, depending on the amount of gas replaced. The amount of gas replaced can be anywhere from a few milliliters up to about 50 liters or more, but can be less than a new fill. As an example, the gas handling unit connected to the laser tube, either directly or through an additional valve assembly, such as may include a small compartment for regulating the amount of gas injected, can include a gas line for injecting a premix A including 1% $F_2$:99% Ne, and another gas line for injecting a premix B including 1% Kr:99% Ne, for a KrF laser. For an ArF laser, premix B can have Ar instead of Kr, and for a $F_2$ laser premix B may not be used. Thus, by injecting premix A and premix B into the tube via the valve assembly, the fluorine and krypton concentrations (for the KrF laser, e.g.) in the laser tube, respectively, can be replenished. A certain amount of gas can be released that corresponds to the amount that was injected. Additional gas lines and/or valves can be used to inject additional gas mixtures. New fills, partial and mini gas replacements, and gas injection procedures, such as enhanced and ordinary micro-halogen injections on the order of between 1 milliliter or less and 3–10 milliliters, and any and all other gas replenishment actions, can be initiated and controlled by the processor, which can control valve assemblies of the gas handling unit and the laser tube based on various input information in a feedback loop.

Line-narrowing features in accordance with various embodiments of a laser system can be used along with the wavefront compensating optic. For an $F_2$ laser, the optics can be used for selecting the primary line $\lambda_1$ from multiple lines around 157 nm. The optics can be used to provide additional line narrowing and/or to perform line-selection. The resonator can include optics for line-selection, as well as optics for line-narrowing of the selected line. Line-narrowing can be provided by controlling (i.e., reducing) the total pressure.

Exemplary line-narrowing optics contained in the rear optics module can include a beam expander, an optional interferometric device such as an etalon and a diffraction grating, which can produce a relatively high degree of dispersion, for a narrow band laser such as is used with a refractive or catadioptric optical lithography imaging system. As mentioned above, the front optics module can include line-narrowing optics as well.

Instead of having a retro-reflective grating in the rear optics module, the grating can be replaced with a highly reflective mirror. A lower degree of dispersion can be produced by a dispersive prism, or a beam expander and an interferometric device such as an etalon. A device having non-planar opposed plates can be used for line-selection and narrowing, or alternatively no line-narrowing or line-selection may be performed in the rear optics module. In the case of an all-reflective imaging system, the laser can be configured for semi-narrow band operation, such as may have an output beam linewidth in excess of 0.5 pm, depending on the characteristic broadband bandwidth of the laser. Additional line-narrowing of the selected line can then be avoided, instead being provided by optics or by a reduction in the total pressure in the laser tube.

For a semi-narrow band laser such as is used with an all-reflective imaging system, the grating can be replaced with a highly reflective mirror, and a lower degree of dispersion can be produced by a dispersive prism. A semi-narrow band laser would typically have an output beam linewidth in excess of 1 pm, and can be as high as 100 pm in some laser systems, depending on the characteristic broadband bandwidth of the laser.

The beam expander of the above exemplary line-narrowing optics of the rear optics module can include one or more prisms. The beam expander can include other beam expanding optics, such as a lens assembly or a converging/diverging lens pair. The grating or a highly reflective mirror can be rotatable so that the wavelengths reflected into the acceptance angle of the resonator can be selected or tuned. Alternatively, the grating, or other optic or optics, or the entire line-narrowing module, can be pressure tuned. The grating can be used both for dispersing the beam for achieving narrow bandwidths, as well as for retroreflecting the beam back toward the laser tube. Alternatively, a highly reflective mirror can be positioned after the grating, which can receive a reflection from the grating and reflect the beam back toward the grating in a Littman configuration. The grating can also be a transmission grating. One or more dispersive prisms can also be used, and more than one etalon can be used.

Depending on the type and extent of line-narrowing and/or selection and tuning that is desired, and the particular laser that the line-narrowing optics are to be installed into, there are many alternative optical configurations that can be used.

A front optics module can include an outcoupler for outcoupling the beam, such as a partially reflective resonator reflector. The beam can be otherwise outcoupled by an intra-resonator beam splitter or partially reflecting surface of another optical element, and the optics module could in this case include a highly reflective mirror. The optics control module can control the front and rear optics modules, such as by receiving and interpreting signals from the processor and initiating realignment or reconfiguration procedures.

The material used for any dispersive prisms, beam expander prisms, etalons or other interferometric devices, laser windows, and/or the outcoupler can be a material that is highly transparent at excimer or molecular fluorine laser wavelengths, such as 248 nm for the KrF laser, 193 nm for the ArF laser and 157 nm for the $F_2$ laser. The material can be capable of withstanding long-term exposure to ultraviolet light with minimal degradation effects. Examples of such materials can include $CaF_2$, $MgF_2$, BaF2, LiF, and $SrF_2$. In some cases fluorine-doped quartz can be used, while fused silica can be used for the KrF laser. Many optical surfaces, particularly those of the prisms, can have an anti-reflective coating, such as on one or more optical surfaces of an optic, in order to minimize reflection losses and prolong optic lifetime.

Various embodiments relate particularly to excimer and molecular fluorine laser systems configured for adjustment of an average pulse energy of an output beam, using gas handling procedures of the gas mixture in the laser tube. The halogen and the rare gas concentrations can be maintained constant during laser operation by gas replenishment actions for replenishing the amount of halogen, rare gas, and buffer gas in the laser tube for KrF and ArF excimer lasers, and halogen and buffer gas for molecular fluorine lasers, such that these gases can be maintained in a same predetermined ratio as are in the laser tube following a new fill procedure. In addition, gas injection actions such as $\mu$HIs can be advantageously modified into micro gas replacement procedures, such that the increase in energy of the output laser beam can be compensated by reducing the total pressure. In contrast, or alternatively, conventional laser systems can reduce the input driving voltage so that the energy of the output beam is at the predetermined desired energy. In this way, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube.

Further stabilization by increasing the average pulse energy during laser operation can be advantageously performed by increasing the total pressure of gas mixture in the laser tube up to $P_{max}$. Advantageously, the gas procedures set forth herein permit the laser system to operate within a very small range around $HV_{opt}$, while still achieving average pulse energy control and gas replenishment, and increasing the gas mixture lifetime or time between new fills.

A laser system having a discharge chamber or laser tube with a same gas mixture, total gas pressure, constant distance between the electrodes and constant rise time of the charge on laser peaking capacitors of the pulser module, can also have a constant breakdown voltage. The operation of the laser can have an optimal driving voltage $HV_{opt}$, at which the generation of a laser beam has a maximum efficiency and discharge stability.

Variations on embodiments described herein can be substantially as effective. For instance, the energy of the laser beam can be continuously maintained within a tolerance range around the desired energy by adjusting the input driving voltage. The input driving voltage can then be monitored. When the input driving voltage is above or below the optimal driving voltage $HV_{opt}$ by a predetermined or calculated amount, a total pressure addition or release, respectively, can be performed to adjust the input driving voltage a desired amount, such as closer to $HV_{opt}$, or otherwise within a tolerance range of the input driving voltage. The total pressure addition or release can be of a predetermined amount of a calculated amount, such as described above. In this case, the desired change in input driving voltage can be determined to correspond to a change in energy, which would then be compensated by the calculated or predetermined amount of gas addition or release, such that similar calculation formulas may be used as described herein.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of generating an optical pulse in a gas discharge laser, comprising:
   applying a main discharge voltage to a pair of main discharge electrodes in a discharge chamber of the laser in order to charge the pair of main discharge electrodes;
   receiving a signal from a photodetector indicating the emission of an optical pulse in the oscillator chamber;
   receiving the optical pulse from the oscillator chamber;
   applying a trigger ionization voltage to an ionization element in the discharge chamber, subsequent to the charging of the pair of main electrodes, such that the discharge of the charged pair of main discharge electrodes substantially coincides with the receiving of the optical pulse, the signal received from the photodetector being used to determine the timing of the application of the trigger ionization voltage; and
   discharging the main discharge voltage between the main discharge electrodes in response to the applying of the trigger ionization voltage.

2. A method according to claim 1, further comprising:
   timing the application of the trigger ionization voltage to occur when a maximum voltage charge exists on the pair of main discharge electrodes.

3. A method according to claim 1, wherein:
   applying a trigger ionization voltage to an ionization element includes applying the trigger ionization voltage to an ionization element selected from the group consisting of ionization electrodes, corona rods, and ionization pins.

4. A method according to claim 1, further comprising:
   using an ionization circuit to apply the trigger ionization voltage, the ionization circuit being electrically isolated from a discharge circuit used to apply the main discharge voltage.

5. A method according to claim 1, further comprising:
   using an ionization circuit to apply the trigger ionization voltage, the ionization circuit including a high-voltage solid state switch whereby the trigger ionization is applied in response to a closing of the solid state switch.

6. A method according to claim 1, further comprising:
   amplifying the optical pulse in the discharge chamber when the charged pair of main electrodes discharges.

7. A method according to claim 1, wherein:
   timing the application of the trigger ionization voltage further includes receiving a signal from an electronic control module, the signal indicating a delay for the timing of the application.

8. A method of generating an optical pulse in a gas discharge laser, comprising:
   applying a main discharge voltage to a pair of main discharge electrodes in a discharge chamber of the laser in order to charge the pair of main discharge electrodes;
   applying a trigger ionization voltage to an ionization element in the discharge chamber, subsequent to the charging of the pair of main electrodes;
   receiving an optical pulse from an oscillator chamber;
   discharging the main discharge voltage between the main discharge electrodes in response to the applying of the trigger ionization voltage; and
   timing the application of the trigger ionization voltage such that the discharge of the charged pair of main discharge electrodes substantially coincides with the receiving of the optical pulse, a determination of the timing including receiving a signal from a pick off loop for the oscillator chamber, the signal indicating the application of a charging voltage to a pre-ionization unit of the oscillator chamber.

9. A method of generating an optical pulse in a gas discharge laser, comprising:
   applying a main discharge voltage to a pair of main discharge electrodes in a first discharge chamber of the laser in order to charge the pair of main discharge electrodes;
   receiving an optical pulse from a second discharge chamber; and
   applying a trigger ionization voltage to an ionization element in the first discharge chamber, subsequent to the charging of the pair of main discharge electrodes, such that the main discharge voltage between the main discharge electrodes is discharged, in response to the applying of the trigger ionization voltage, at a time that substantially coincides with the receiving of the optical pulse.

10. A method according to claim 9, wherein:
applying a trigger ionization voltage to an ionization element includes applying the trigger ionization voltage to an ionization element selected from the group consisting of ionization electrodes, corona rods, and ionization pins.

11. A method according to claim 9, further comprising:
using an ionization circuit to apply the trigger ionization voltage, the ionization circuit being electrically isolated from a discharge circuit used to apply the main discharge voltage.

12. A method according to claim 9, further comprising:
using an ionization circuit to apply the trigger ionization voltage, the ionization circuit including a high-voltage solid state switch whereby the trigger ionization is applied in response to a closing of the solid state switch.

13. A method according to claim 9, wherein:
an optical pulse is generated in the discharge chamber when the charged pair of main electrodes discharges.

14. A method according to claim 9, further comprising:
amplifying the optical pulse in the discharge chamber when the charged pair of main electrodes discharges.

* * * * *